May 25, 1926.

C. ATHERTON 1,585,816

REMOTE CONTROL VALVE APPARATUS

Filed April 9, 1923  2 Sheets-Sheet 1

INVENTOR.
Charles Atherton
BY Lyon & Lyon
ATTORNEYS

May 25, 1926.
C. ATHERTON
1,585,816
REMOTE CONTROL VALVE APPARATUS
Filed April 9, 1923    2 Sheets-Sheet 2
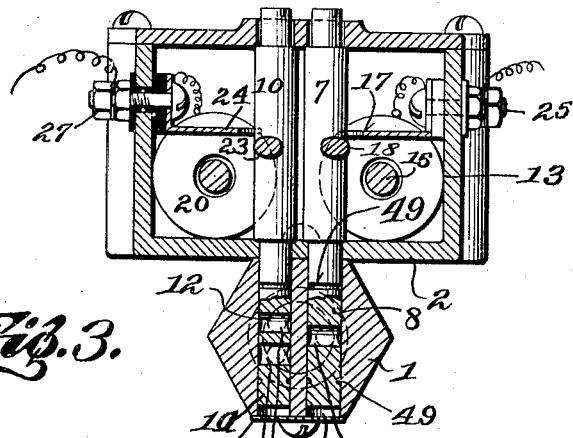
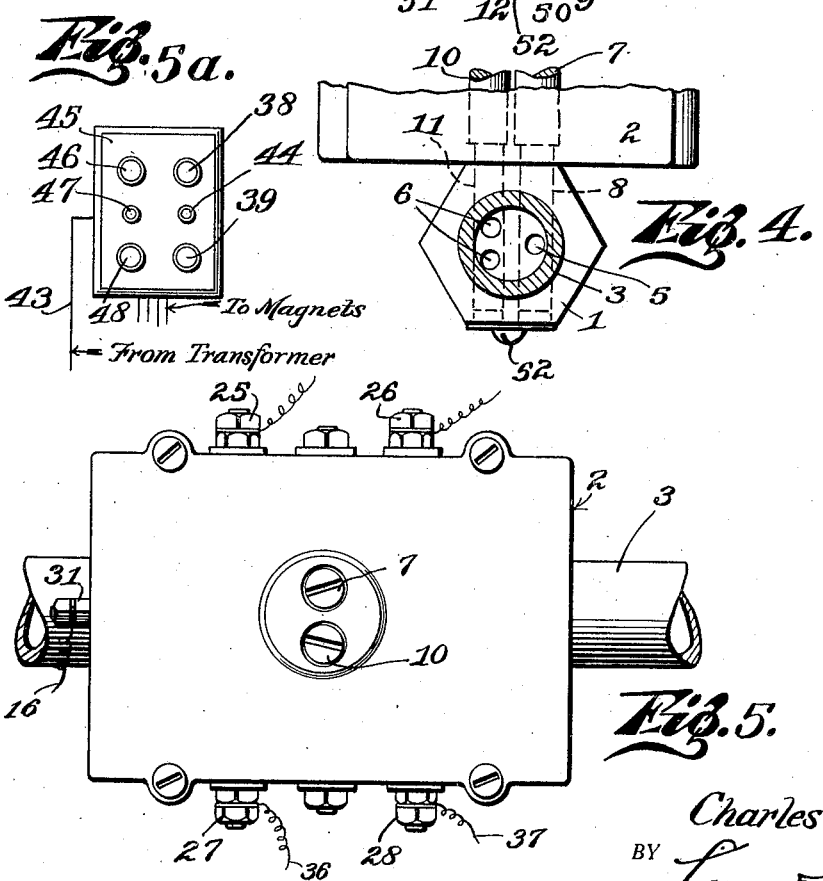
INVENTOR.
Charles Atherton,
BY Lyon & Lyon
ATTORNEYS Patented May 25, 1926.

1,585,816

UNITED STATES PATENT OFFICE.

CHARLES ATHERTON, OF PASADENA, CALIFORNIA, ASSIGNOR TO REMOTE CONTROL VALVE AND MANUFACTURING COMPANY, OF PASADENA, CALIFORNIA, A CORPORATION OF CALIFORNIA.

REMOTE-CONTROL VALVE APPARATUS.

Application filed April 9, 1923. Serial No. 631,050.

This invention relates to a remote control valve apparatus, and while features of the invention may be applied to the controlling of a valve used for any purpose whatever, the invention is expected to be especially useful as applied to the controlling of a remote gas valve. The apparatus is especially adapted for use in a residence for controlling a gas heater from a distance. The general object of the invention is to provide simple means for effecting a remote control of a valve in such a way as to enable different amounts of the controlled fluid to pass the valve and also to provide simple means for indicating the condition of the valve, that is to say, to indicate whether it is completely closed or disposed in its different open positions corresponding to different quantities of gas which it is desired to consume. A further object of the invention is to provide such a control device with means whereby the control can be effected merely by means of push buttons such as commonly used in wall plates for controlling signals or other controlled devices.

Further objects of the invention will appear hereinafter.

The invention consists in the novel parts and combination of parts to be described hereinafter, all of which contribute to produce an efficient remote control valve apparatus.

A preferred embodiment of the invention is described in the following specification while the broad scope of the invention is pointed out in the appended claims.

In the drawing:

Fig. 3 is a cross section taken about on the line 3—3 of Figure 1, but showing the casing held in a different position.

Figure 2:
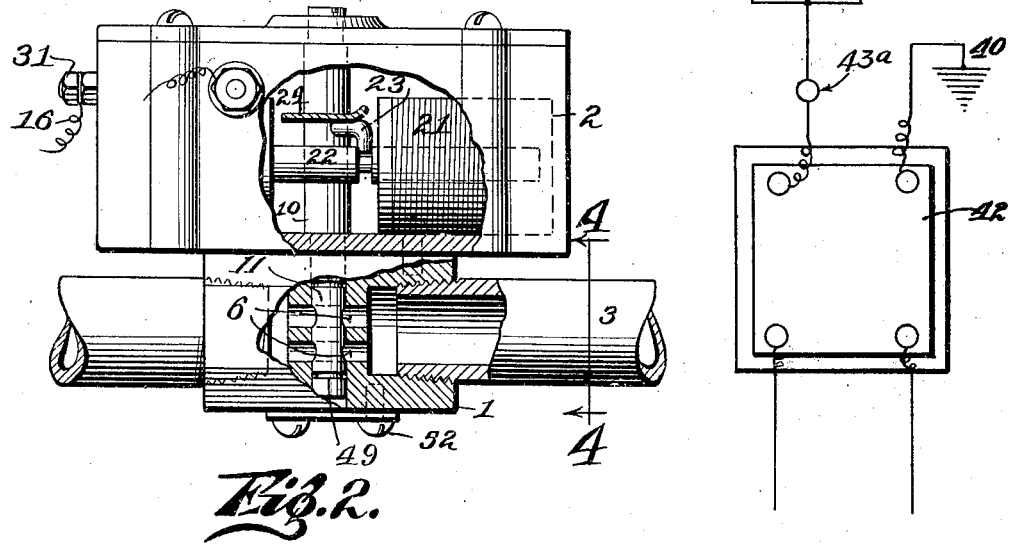
Fig. 2 is a plan of the valve casing shown in Figure 1, certain parts being broken away so as to illustrate further the details of the apparatus.

Fig. 4 may be regarded as a section taken about on the line 4—4 of Figure 2, and particularly illustrating the details of the valve means and valve ports.

Fig. 5 is a view showing the valve casing with the cover plate in place.

Fig. 5ª is a front elevation showing a wall plate further illustrating the wearing arrangement and the position of the signals.

The valve means which I have illustrated is constructed in such a way as to enable different quantities of gas to pass the valve and while different constructions may be used for this purpose, in the present instance I provide for three different degrees of opening at the valve, that is to say, in one relation of the valve device, a certain amount of gas may pass and in another relation of the valve twice that amount of gas may pass, and in a third relation of the parts at the valve, a third quantity of gas may pass the valve. I prefer to construct the valve so that the three stages of valve opening differ from each other by an equal amount so that the ratio of the different valve positions correspond to the numbers 1, 2 and 3.

In order to accomplish this in a simple manner I provide a valve casing 1, having an extension 2 constituting a box to contain electro-magnets for controlling the valve opening. The valve casing is connected in the fluid supply pipe or gas pipe 3, see Figure 2, and is provided with a gas port or passage 5, see Figure 4, opposite to which are located two similar passages 6 of equal diameter. I provide a valve member 7, including a rotary plug 8 with a transverse port 9 to cooperate with the passage 5 and I provide a similar valve member 10 having a rotary plug 11 with two ports 12 which aline with and cooperate with the passages 6, see Figures 3 and 4.

With this organization it will be evident that when the valve plug 8 is in its open position the area of the passage 5 will be open to the flow of gas. If this valve plug is in its closed position and the valve plug 11 in its open position, then the two ports 6, giving twice the area of the port 5, will be open to gas; if both the plugs 8 and 11 are in their open position, then all three ports will be open and three times the quantity of gas can flow through as when the port 5 is open alone.

In order to enable the valve to be controlled from a distance and at the same time to indicate the condition of the valve as to the port area which is open for the flow of gas, I provide electro-magnetic means in the coil box 2 and I prefer to control the same through the agency of grounded circuits, thereby avoiding the necessity for a return wire for the circuits.

Within the coil box I provide two coils 13 and 14, the former of which I shall call an "on" coil because it turns the valve plug 8 into its open or "on" position, and I call the coil 14 an "off" coil because it will return this valve member to its closed position. These coils are preferably arranged coaxially with each other and in an opposed relation so that they can control a common core 15 which is simply a metal bar guided in the coils and freely movable.

Figure 1:
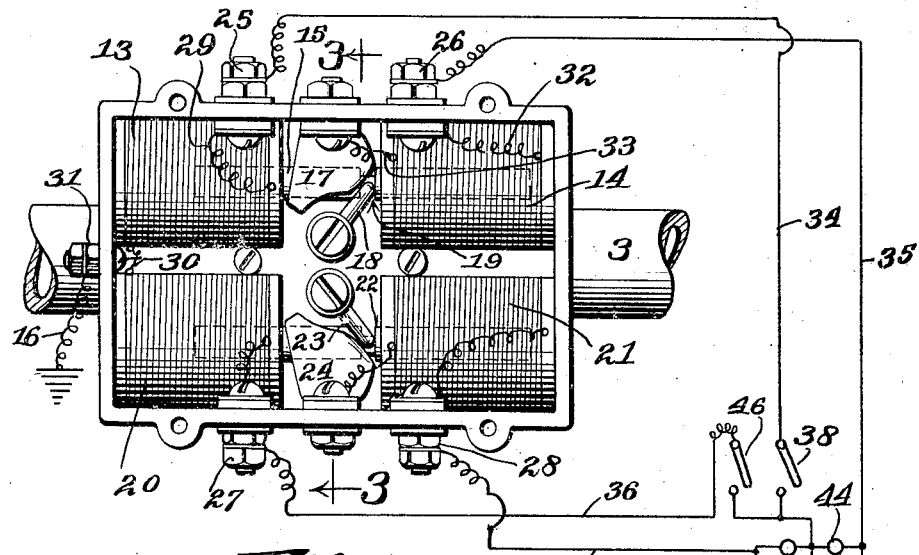
Figure 1 is a diagrammatic view illustrating the wiring arrangement and showing the valve casing with the cover plate removed so as to illustrate the electromagnets which control the valve means.

The rotary valve member 7 extends through the coil box and is mounted so that it will be actuated by the core 15 when the same moves toward either of the coils, and in being moved the valve member, which is grounded through the coil box as indicated by the grounding wire 16, will form metallic engagement with a fixed contact plate 17 which is mounted on and insulated from the wall of the coil box. In order to rotate the valve member 7, it is provided with a short arm 18, the outer end of which projects into a groove 19 formed in the core 15, see Figure 1. In the position in which this arm is shown in Figure 1 it is out of contact with the plate 17 but when the coil 13 is energized the core will be moved to the left and the arm 18 will swing under the plate 17 and into contact with its side face. In order to control the valve member 10 I provide two similar coils, an "on" coil 20 and an "off" coil 21, and these coils are mounted coaxially and cooperate with a core 22 similar to the core 15 and operatively connected with an arm 23 on the valve member 10 which can close the circuit by contact with a contact plate 24 similar to the plate 17 and similarly mounted in an insulated manner on the coil box.

The coil box is provided with four terminals 25, 26, 27 and 28. The terminal 25 is connected by wire 29 to the coil 13 and the coil 13 is grounded by a wire 30 to a terminal 31 connected with the grounding wire 16. The use of this terminal and grounding wire 16 is principally for the sake of clearness in disclosing the invention, and particularly to facilitate the reading of the circuits shown in the diagram. The terminal 26 is connected by a wire 32 with the coil 14 and the coil 14 is connected by a wire 33 at its other end with the contact plate 17. A similar wiring arrangement is employed for the coils 20 and 21, that is to say, the left end of the coil 20 is grounded through the wire 30 and it is connected at its other end to the terminal 27. The terminal 28 is connected to the right hand end of the coil 21 and the other end of this coil is connected by a wire to the contact plate 24. I provide four conductors 34, 35, 36 and 37 which are connected respectively with the four terminals 25, 26, 27 and 28 and I provide a push button indicated by the number 38 in Figure 5ª and indicated diagrammatically in Figure 1. This button I call an "on" button because it controls the "on" magnet or coil 13. I also provide an "off" button 39 indicated in Figure 5ª and illustrated diagrammatically in Figure 1. The push button 38 is connected with the wire 34 which leads to the coil 13 and the push button 39 is connected to the wire 35. By pressing the push button 38 a circuit is closed from the ground at 40 through the secondary coil of a transformer 42, and through a signal light 43ª and a conductor 43 leading from the transformer, thence through the push button 38 and through the coil 13 to wire 34, and thence through the wire 16. This will energize the coil 13 and the core 15 will be attracted toward it, thereby moving the contact arm 18 of the valve member toward the left which will open the valve member 7, and turn on the gas; this movement will also produce metallic contact between the insulated contact plates 17 and the valve member 7 so that a circuit will then be formed from the transformer as before and through an automatic "on" signal light 44 which is wired between the conductor 43 and the wire 35. After the button 38 is released a permanent signal circuit is maintained through the visible signal 44 through the wire 35, coil 14, contact plate 17 and to the ground through the wire 16 by way of the valve member mounted in the coil box. With this circuit it will be evident that current is flowing through the "off" coil 14, but by reason of the high resistance of the signal device 44 the power of the coil 14 will be insufficient to attract the core 15 and hence the valve member 7 will remain in its open position. The signal 44 may be placed for convenience in a wall plate 45 between the two buttons 38 and 39, see Figure 5ª. As soon as the valve member 7 is in its open position this will be indicated by glowing of this light 44. The wiring circuit for coils 20 and 21 is similar to that for coils 13 and 14. When it is desired to increase the supply of gas which can pass the valve casing 1, the second "on" button 46 should be pressed which will close a circuit from the wire 43 through the wire 36 and the coil 20 to the ground; as soon as arm 23 touches contact 24 a permanent grounded circuit will pass through it and coil 21, and through a visible signal or lamp 47 similar to the lamp 44. As with the coils 13 and 14, by reason of the high resistance of signal 47 the current will be too weak to enable the coil 21 to move the armature.

If both of the push buttons 38 and 46 have been depressed in this way, an amount of gas will pass the valve equivalent to three times the flow resulting from pressing the push button 38.

If it is desired to have less gas than this, the "off" button 39 can be depressed which will close a circuit through the wire 43, push button 39, wire 35 and through the "off" coil 14, short-circuiting the signal lamp 44 and energizing the coil 14 sufficiently to enable it to attract the core 15. This will move the core to the right and into the position in which it is indicated in Figure 1. This will break the contact between the arm 18 and the plate 17 and thereby open the signal circuit.

A push button 48 is provided which is similar to the push button 39 and when this push button is depressed it closes the circuit from the wire 43 through the wire 37 and through the magnet coil 21 and thence to the contact plate 24 and through the arm 23 to the coil box and thence to the ground through the wire 16. This will short circuit the signal 47 and energize coil 21 sufficiently to pull the arm 23 over to the position shown in Figure 1 which will put the valve member 10 in its closed position.

In order to insure that the valve members will be gas tight, each valve plug is provided with annular packing grooves 49, see Figure 3 and these packing grooves may be filled with a soft packing material such as felt. In addition to this the bores in the casing which receive the plugs 8 and 11 may be provided with a packing space 50 and these packing spaces are covered by a cover plate 51 secured in place by small screws 52. The signal light 43ª is located near the transformer 42 and indicates whether the current is flowing in the circuit through conductor 43.

It is understood that the embodiment of the invention described herein is only one of the many embodiments this invention may take and I do not wish to be limited in the practice of my invention nor in my claims to the particular embodiment set forth.

If the resistance of the lamp 44 is insufficient to enable the coil 14 to function as described, obviously any necessary resistance may be put in series with the lamp between the conductors 43 and 35 and likewise as to lamp 47 it will be obvious that after the operation of the "off" buttons the circuits are restored to their normal condition.

What I claim is:

1. In a remote-control valve apparatus, the combination of a casing with a fluid passage therethrough, a movable valve member mounted in the casing and having a port for the fluid, an "on" push button at a controlling station with a corresponding electric circuit including means for actuating the valve member to move it to its open position, a second valve member movable independently of the first named valve member mounted in the casing and having a port of substantially larger area than the port of the first named valve member, a second "on" push button at the controlling station with its corresponding electric circuit including means for actuating the last named valve member to move it to its open position, whereby a supply of fluid may be permitted to pass through the fluid passage corresponding to the port area of the first named valve member or corresponding to the port area of the second named valve member, or corresponding to the port area of both valve members; and an "off" push button corresponding to each of the valve members with its corresponding electric circuit including means for moving the valve members independently to their closed positions, and means for indicating the position of both valves.

2. In a remote-control valve apparatus, the combination of a casing with a fluid passage therethrough, a movable valve member mounted in the casing and having a port for the fluid, an "on" push button at a controlling station with a corresponding electric circuit including means for actuating the valve member to move it to its open position, a second valve member movable independently of the first named valve member mounted in the casing and having a port of substantially larger area than the port of the first named valve member, a second "on" push button at the controlling station with its corresponding electric circuit including means for actuating the last named valve member to move it to its open position, whereby a supply of fluid may be permitted to pass through the fluid passage corresponding to the port area of the first named valve member or corresponding to the port area of the second named valve member, or corresponding to the port area of both valve members; and an "off" push button corresponding to each of the valve members with its corresponding electric circuit including means for moving the valve members independently to their closed positions, and an automatic visible signal corresponding to each of the "on" buttons for indicating whether the corresponding valve member is in its open or closed position.

3. In a remote-control valve apparatus, the combination of a casing having a fluid passage therein, a valve member within the casing for controlling the flow through the said passage, an "on" push button with its corresponding electric circuit including a solenoid coil, an "off" push button with its corresponding electric circuit including a solenoid coil disposed coaxially with and opposite to the first named solenoid coil, a core disposed within said coils and freely movable so that the energized coil will pull the core away from the opposite coil, an insulated contact disposed between the coils, an arm carried by the valve member and engaging the core whereby the energizing of the first named coil will pull the core toward it and effect a metallic contact between the valve member and the insulated contact, and a grounded circuit including a visible signal connected with the said contact, said valve member being grounded whereby its engagement with said contact produces a grounded circuit through the visible signal.

4. In a remote-control valve apparatus, the combination of a casing having a fluid passage therein, a valve member within the casing for controlling the flow through the said passage, an "on" push button with its corresponding electric circuit including a solenoid coil, an "off" push button with its corresponding electric circuit including a solenoid coil, and a visible signal connected in series therewith, a core controlled by said coils and freely movable so that the energized coil will pull the core away from the other coil, an insulated contact mounted on the casing, an arm carried by the valve member and actuated by the core whereby the energizing of the first named coil will actuate the core and effect a metallic contact between the valve member and the insulated contact, and cooperating means for forming a grounded circuit through either of the coils at will.

5. In a remote-control valve apparatus, the combination of a casing, a valve-member within the casing for controlling the flow through the valve, an "on" solenoid coil, an "off" solenoid coil, actuating means operated by the coils for moving the valve-member to turn the valve on or off, means for closing a circuit through the "on" solenoid, a signal, means operated by the actuating means when moved by the "on" coil, to close a circuit through the "off" coil and through the signal, the resistance in the circuit at the signal operating to prevent movement of the actuating means by the "off" coil, and means for short-circuiting the signal to reduce the resistance and effect the actuation of the actuating means by the "off" coil.

6. In a remote-control valve apparatus, the combination of a casing, a valve-member within the casing for controlling the flow through the valve, an "on" solenoid coil, an "off" solenoid coil, actuating means operated by the coils for moving the valve member to turn the valve on or off, a push-button for closing a temporary circuit through the "on" solenoid, a signal, means operated by the actuating means when moved by the "on" coil to close a permanent circuit through the "off" coil and through the signal, the resistance of the signal operating to prevent movement of the actuating means by the "off" coil, and a switch for short-circuiting the signal and thereby operate the actuating means by the "off" coil.

7. In a remote-control valve apparatus, the combination of a casing, a valve member within the casing for controlling the flow through the valve, a signal, an "on" solenoid coil, an "off" solenoid coil, a core moved by the coils for actuating the valve member to turn the valve on or off, and having a grounded contact member, an insulated contact member to be engaged by the grounded contact member and connected with the "off" coil, said contact members co-operating when the "on" coil has been energized, to close a grounded circuit through the "off" coil and through the signal, the resistance of the signal operating to prevent movement of the core by the "off" coil, and a push-button for short circuiting the signal to reduce the resistance and effect the actuation of the core by the "off" coil.

Signed at Los Angeles, California, this 29th day of March, 1923.

CHARLES ATHERTON.